Oct. 5, 1937.  E. FROMWILLER  2,094,981
COFFEE MAKING MACHINE OR PERCOLATOR
Filed June 7, 1935  4 Sheets-Sheet 1
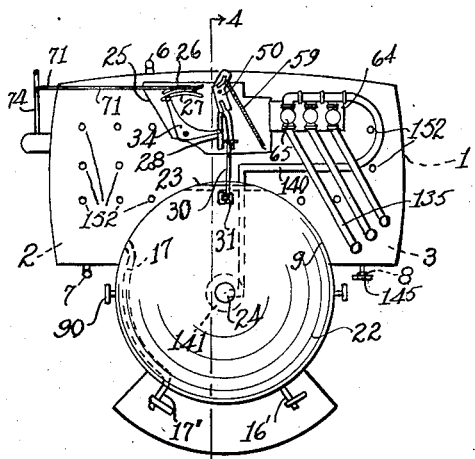
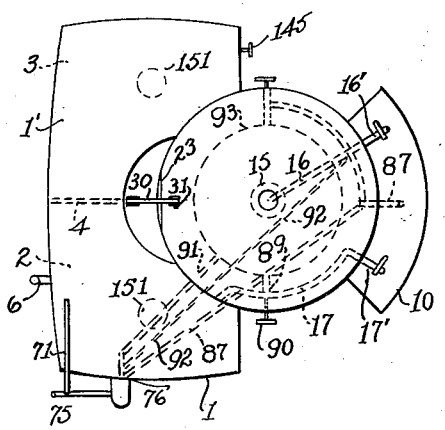
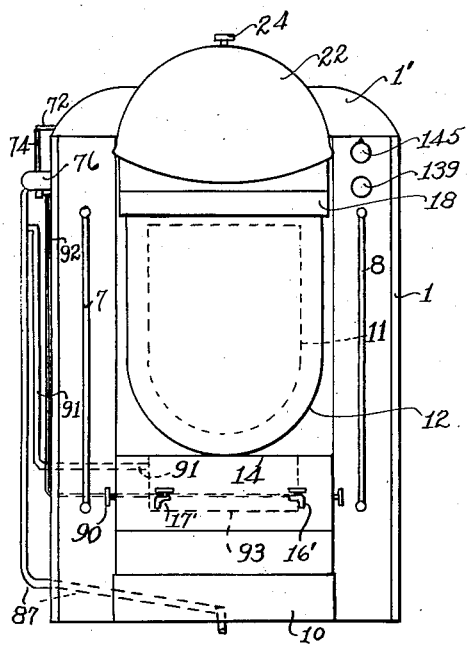
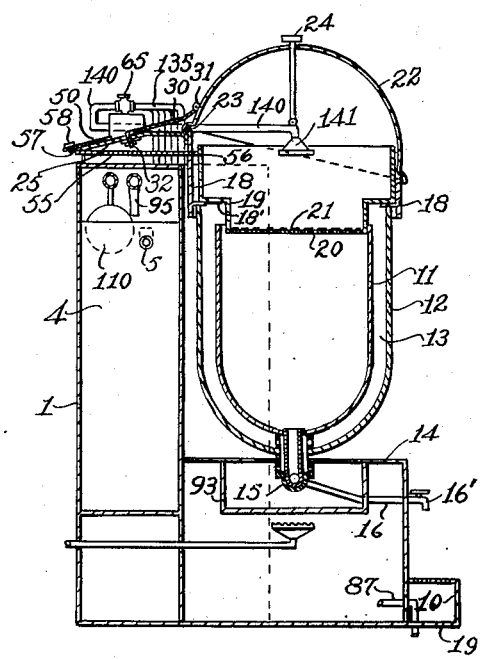
INVENTOR
Edward Fromwiller
BY
Gifford, Scull & Burgess
ATTORNEYS Oct. 5, 1937.  E. FROMWILLER  2,094,981
COFFEE MAKING MACHINE OR PERCOLATOR
Filed June 7, 1935  4 Sheets-Sheet 2

INVENTOR
Edward Fromwiller
BY
Gifford, Scull & Burgess
ATTORNEYS

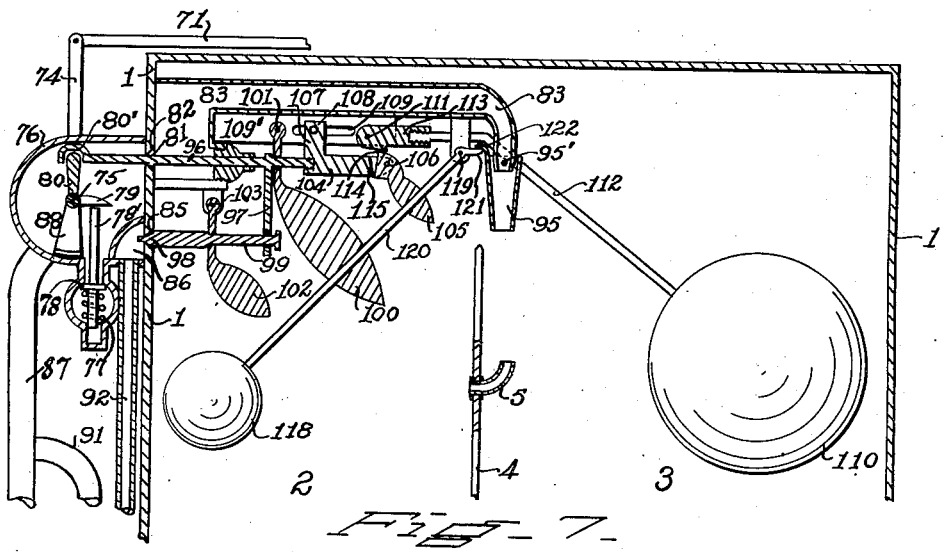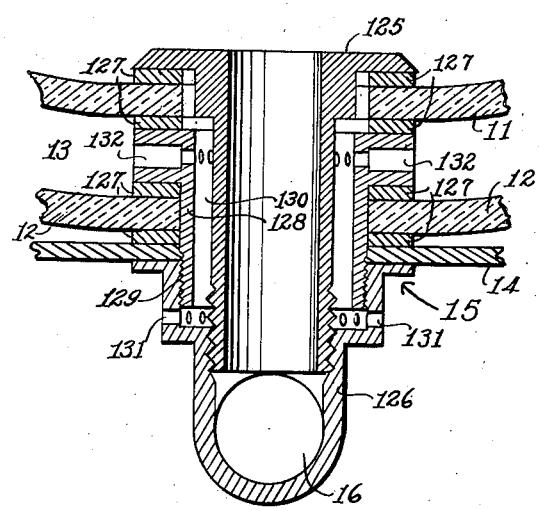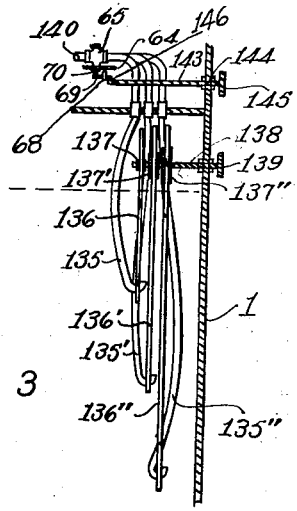

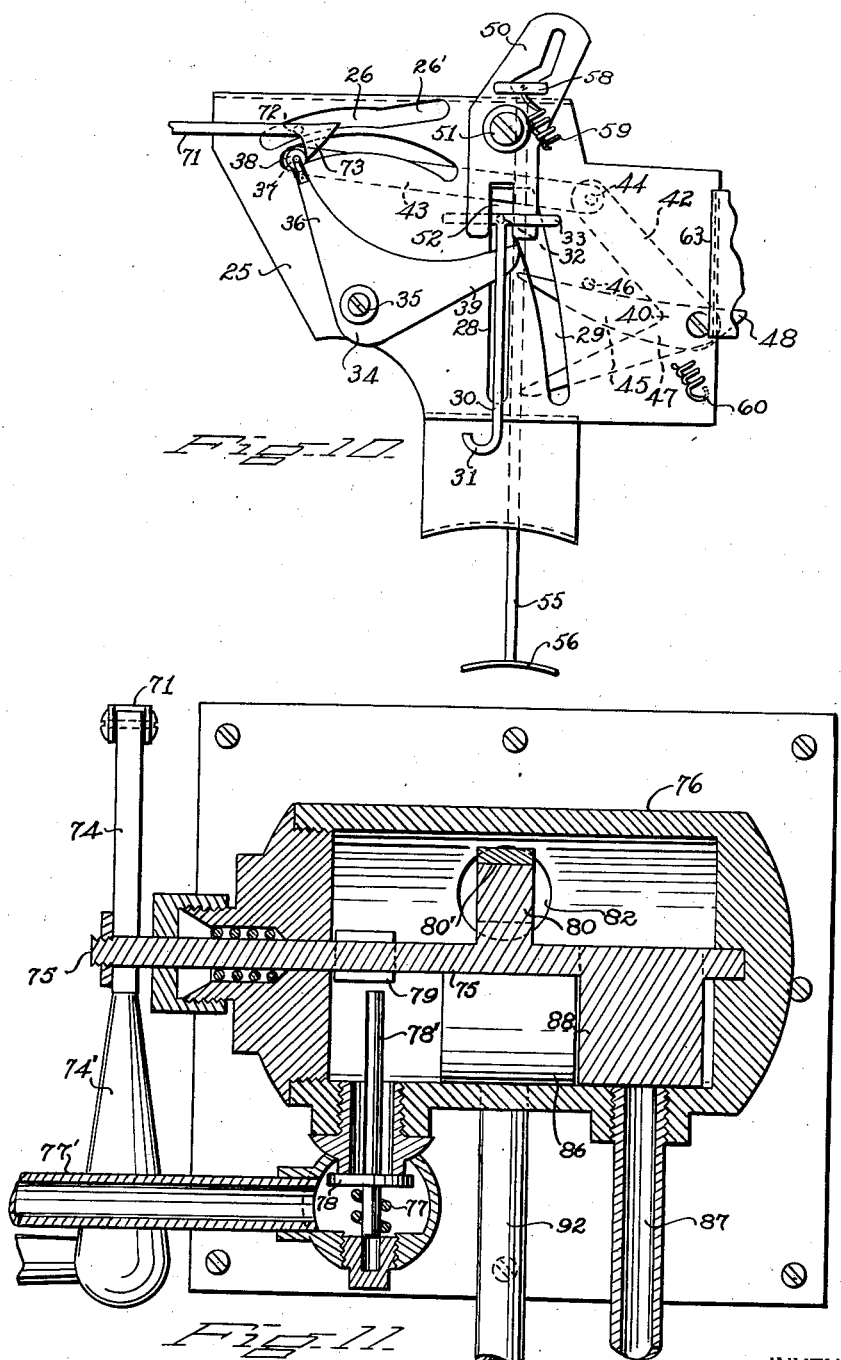

Patented Oct. 5, 1937

2,094,981

UNITED STATES PATENT OFFICE 2,094,981

COFFEE MAKING MACHINE OR PERCOLATOR

Edward Fromwiller, Brooklyn, N. Y.

Application June 7, 1935, Serial No. 25,386

7 Claims. (Cl. 53—3)

This invention relates to a coffee making machine or percolator by means of which a supply of hot water is available for any purpose for which it may be needed and at the same time a separate supply of hot water is available for making coffee. The latter supply of hot water can be drawn off and percolated through coffee grounds for making coffee in amounts that are in accordance with the amount of coffee grounds that are in the coffee grounds container and the amounts of the hot water used can also be varied for the purpose of varying the strength of the coffee that is made. Provision is also made whereby fresh water can be supplied at will for washing the inside of the coffee container whenever desired and fresh supplies of water are automatically furnished from an outside source to be heated for the general hot water supply and also for the hot water supply for making coffee. Provision is also made whereby opening a cover or lid, inserting a coffee grounds container, and closing the cover causes hot water to be sprayed over and percolate through the coffee grounds in measured amounts. The supply of water for the containers can be replenished whenever needed. The hot water container is provided with a safety valve for steam and provision is made for filling one of the containers to the desired amount with fresh water before the other container or compartment is filled.

Figure 5:
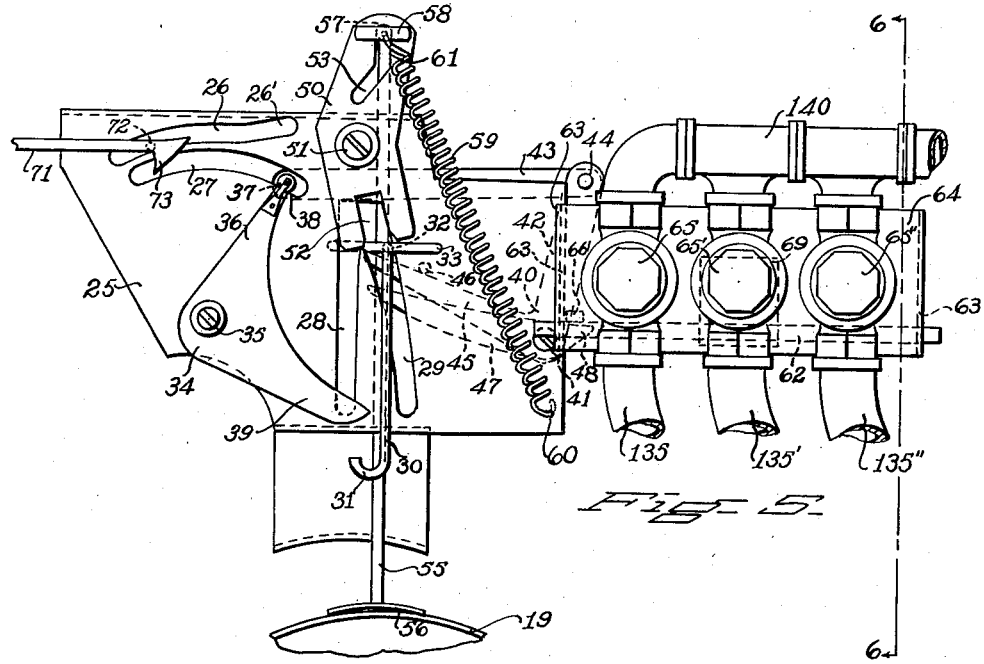
Figure 6:
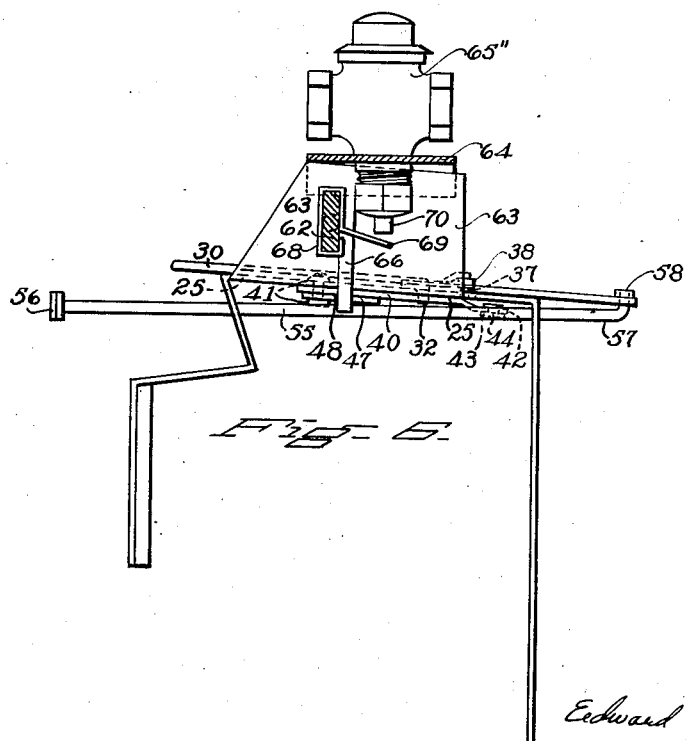

The invention will be understood from the description in connection with the accompanying drawings in which Fig. 1 is plan view of an illustrative embodiment of the invention with the top or cover omitted; Fig. 2 is a similar view with the cover in place; Fig. 3 is a front view; Fig. 4 is a vertical section along the line 4—4 of Fig. 1 with the cover omitted; Fig. 5 is a plan view of some of the details on an enlarged scale; Fig. 6 is a vertical section on an enlarged scale showing some of the details; Fig. 7 is a vertical section through the device on an enlarged scale showing valve arrangements; Fig. 8 is a side view, partly in section, showing more of the details; Fig. 9 is a vertical section on an enlarged scale showing certain parts; Fig. 10 is a plan view, partly broken away, similar to Fig. 1 showing parts in other positions, and Fig. 11 is a section through one of the valves on an enlarged scale.

In the drawings reference character 1 indicates a closed container, which is preferably made of metal, such as copper. This container is provided with a cover 1' spaced from it. This container is divided into two tanks or compartments 2 and 3 by means of a partition 4, which is preferably heat insulated, which extends from the bottom of the container 1 and terminates a short distance from the top, thereby permitting free communication between the upper ends of the tanks 2 and 3 in this container. An overflow pipe 5 is provided through the partition 4 from the tank 3 to the tank 2. A safety valve 6 (Figs. 1 and 2) is provided for the tank 1 to relieve excess steam pressure and water level gauges 7 and 8 are provided along the front side for the tanks 2 and 3 respectively.

An approximately semi-circular recess 9 is provided at the front of the tank 1 and a catch basin and drain 10 is provided in front near the bottom of the tanks 2 and 3. A cylindrical glass coffee urn is located so as to extend partly into the somewhat cylindrical space provided by the recess 9. This coffee urn includes a glass jar 11 (Fig. 4) and a glass jacket 12 spaced from the jar 11 leaving a space 13 between the two.

A support 14 is provided at the lower end of the coffee urn and a hollow spacing member 15 (Figs. 4 and 9) extends through the jars 11 and 12 and the support 14 to keep the jar 11 and jacket 12 in place and to permit withdrawal of coffee from the jar 11. An outlet pipe 16 having a valve 16' leads from the hollow spacing member 15 so that coffee can be withdrawn from the jar 11 when desired. An outlet pipe 17 (Figs. 1, 2 and 3) provided with a valve 17' leads from the hot water compartment 2, thus making hot water available whenever desired.

A cylindrically shaped flanged support 18 (Fig. 4) having its rear side longer than its front side rests upon the upper end of the jacket 12 and a removable, cylindrically shaped coffee grounds holder 19 has a flange or rim 18' that rests upon the flange of the support 18. This coffee grounds holder 19 has a perforated bottom 20 upon which a strainer or filter 21 may be placed to permit hot water that is sprayed or otherwise introduced into the holder to percolate through the coffee grounds.

A dome-shaped lid or cover 22 (Figs. 1-4) for the coffee urn is hinged, as shown at 23, and may be turned about this hinge by means of the handle 24.

A plate 25 (Figs. 1, 4, 5 and 6) is located above the container 1 and below the cover 1' and is spaced from each. A guide slot 26, (Figs. 1, 5 and 10) which is of arcuate shape a portion of the way and is turned outwardly at its inner end, as shown at 26', is provided in the plate 25. Another arcuate shaped guide slot 27 concentric with the slot 26 is provided in this plate.

Two guide slots 28 and 29 having their inner ends merging into each other are also provided in this plate. A rod 30 (Figs. 1, 2, 4, 5 and 10) is pivoted to the lid 22, as shown at 31. It has a downwardly extending end 32 which slides in the slots 28 and 29. The rod 30 carries a cross arm 33 at its end, one end of this cross arm sliding on the upper surface of the plate 25 and the other end extending through the slot 29 and sliding along the lower surface of the plate 25, thus keeping the bent end 32 from accidentally becoming displaced from the slots 28, 29.

An L-shaped lever 34 (Figs. 1, 5 and 10) is pivoted on the plate 25 at 35 located at the center for the arcuate slot 27. The arm 36 of the lever 34 is provided with a projection 37 that extends through the slot 27 and also a pivoted roller 38 that is located above the plate 25. The arm 39 of the lever 34 extends across the slot 28.

An L-shaped lever 40 (Figs. 5, 6 and 10) is pivoted below the plate 25 on the bolt 41. The outer end of the arm 42 of the lever 40 is pivoted to one end of the strap or rod 43, as shown at 44. The other end of the strap or rod 43 is pivoted to the projection 37 on the arm 36. The arm 45 of the lever 40 extends across the slot 29 and a stop 46 is attached to the plate 25 to limit the movement of this lever in one direction. A lever 47 is also pivoted on the bolt 41 and has a projection 48 on the other side of the bolt 41 for a purpose to be described. The lever 47 also extends across the slot 29. A wide lever 50 is pivoted at 51 on the upper side of the plate 25 and has an open slot 52 at its front end and an angular slot 53 near its other end.

A rod 55 (Figs. 4, 5, 6 and 10) provided with a curved plate 56 at one end slides through a hole in the support 18 below the plate 25 and its other end is bent upwardly as shown at 57 and extends through the slot 53 and is kept in place therein by a cross bar 58 attached to it, which cross bar slides along the upper surface of the lever 50. A tension spring 59 having one end anchored to the plate 25, as shown at 60, has its other end connected to the bent end of the rod 55, as shown at 61.

A rectangularly shaped shaft 62 (Figs. 5, 6 and 8) has its ends rounded and journalled in holes in the walls 63 above the top of the container 1. A support 64 is provided for a series of valves 65, 65' and 65" that are normally closed by springs in the well known way. An arm 66 is attached to the shaft 62 and extends downwardly into the path of the extension 48 of the lever 47 so that when the lever 47 is turned in one direction the shaft 62 will also be turned in its bearings. A slide 68, which fits loosely around the shaft 62, is provided with an arm 69 which presses against the lower ends of the valve stems 70 of the valves 65, 65' and 65", respectively, in accordance with the position of this slide on the shaft 62 so as to open the corresponding valve when the lever 47 is turned, as will be described below.

A connector 71 (Figs. 1, 2, 3, 5, 10 and 11) has a projection 72 extending loosely into the guide slot 26 and also has a hook or catch 73 for the roller 38. The connector 71 is pivoted to the arm 74 of the shaft 75. The shaft 75 passes through the housing 76 (Figs. 7 and 11) and is journalled in water-tight bearings in the walls thereof. The shaft 75 may be turned manually by the arm or handle 74'. An inlet 77' to which a cold water supply pipe leads is provided for the housing 76. A valve 78 is provided between the inlet 77' and housing 76. A spring 77 normally keeps this valve closed. An arm 79 carried by the shaft 75 opens the valve 78 by pressing against the valve stem 78' when the shaft 75 is turned. Another arm 80 carried by the shaft 75 has its end extending into a crotch 80' of the stem of the valve 81. A valve seat or opening 82 is provided in the wall of the container 1 for the valve 81. The valve opening 82 provides passage from the housing 76 to a conduit 83 inside of the container 1. An opening or valve seat 85 is provided below the opening 82 in the wall 1, which provides communication between the compartment 2 of the container 1 and an inner housing 86 within the housing 76 when this opening is open. An outlet pipe 87 (Figs. 2, 3 and 11) extends from the housing 76 to the drain pan 10. A valve closure 88 for the end of the outlet pipe 87 is attached to the shaft 75 and closes this outlet when this shaft is turned into a certain position. A branch pipe 89 (Fig. 2) provided with a valve 90 extends from the pipe 17 to the container 93. An air or steam outlet pipe 92 (Figs. 2, 3, 7 and 11) extends from the housing 76 to the pipe 16 near the valve 16'. An overflow pipe 91 extends from a closed container 93 surrounding the lower end of the hollow spacing member 15 to a point in the pipe 87 near the housing 76.

A spout 95 (Fig. 7) is pivoted at the end of the conduit 83 so as to direct incoming water to either side of the partition 4.

A stem 96 (Fig. 7) of the valve 81 has an arm 97 which opens the valve 98 by means of its stem 99. A weight 100 is pivoted at 101 to close the valve 81 and a weight 102 is pivoted at 103 to close the valve 98. A slide 104 is attached to the end of the valve stem 96 and carries a weight 105 pivoted at 106. The arm 107 of the slide 104 is provided with a pin 108 that extends into and slides along the slot 109 in a fixed member 109' below a portion of the conduit 83. A float 110 for the tank 3 is pivoted at 111 on the fixed member 109' by means of the rod 112 and arm 113. A lug 114 on the arm 113 is provided to catch behind the upper edge of the flat end of the weight 105. The lower edge of this flat end strikes against the shoulder 115 on the slide 104 to limit the movement of the weight 105 in a clockwise direction. A float 118 is pivoted on a fixed member at 119 by means of the rod 120. A finger 121 is provided on the rod 120 beyond the pivot 119 to contact with a lip or extension 122 on the pivoted spout 95.

The hollow member 15 (Figs. 4 and 9) is clamped in place by the hollow flanged part 125 screwing into the hollow flanged portion 126, with gaskets 127 bearing upon opposite sides of the edges of the openings through the bottoms of the glass jars 11 and 12. A threaded pipe 128 that is of larger diameter than the main portion of the part 125 is screwed into place, as shown at 129, leaving an annular channel 130. The communication from the container 93 to the space 13 between the jars 11 and 12 is provided through the channel 130 by means of the openings 131 and 132.

A plurality of tubes 135, 135' and 135" (Figs. 1, 4, 5 and 8) that are somewhat flexible extend into the hot water tank 3 and lead to the valves 65, 65' and 65" respectively. The lower ends of the tubes 135, 135' and 135" are bent up and are carried by adjustable supports 136, 136' and 136". These supports are in the form of racks with teeth on one edge which mesh with pinions 137, 137' and 137" of increasing sizes respectively, that are carried by the shaft 138 that is journalled in suitable bearings and has a handle 139 for turning it extending into access of the user. A pipe 140 leads from the three valves 65, 65' and 65" to a sprayer 141 located above the jar 11. The pipe 140 is provided with a swivel joint so that the sprayer 141 can be moved with the cover 22.

A shaft 143 (Fig. 8) is journalled as indicated at 144 and is provided with an operating knob 145 that is accessible to the user. The inner end of this shaft is bent upwardly as indicated at 146 and is pivotally connected to the slide 68 so that by turning the shaft 143 this slide may be moved along the shaft 62 so that its arm 69 will contact with the desired stem 70 of whichever valve 65, 65' or 65" is to be opened.

A burner 150 (Fig. 4) may be provided below the container 93 for heating it, and the tanks 2 and 3 may be heated in any convenient way, as for example by having burners 151 below them from which hot products of combustion pass through the pipes 152 (Fig. 1), or heating gases from other sources may be passed through these pipes for the same purpose.

The operation is as follows:

It will be assumed that the tank 3 is full of hot water, the coffee grounds container 19 has been placed in position to push the rod 55 into the position shown in Fig. 5 and that the cover 22 is open, thus holding the rod 30 in the position shown in this figure. When the cover or lid 22 is closed the downwardly extending portion 32 of the rod 30 turns the arm 45 about its pivot 41, thus causing its end 48 to press against the arm 66 on the shaft 62 (Figs. 5 and 6) thus turning this shaft and causing the arm 69 on the slide 68 to open one of the valves 65, 65' or 65" by pressing one of the valve stems 70 upwardly. The operator will have to move the slide 68 to the valve 65, 65' or 65", depending upon the amount of coffee grounds that have been put in the container 19 and therefore upon the amount of hot water he wishes to be passed through these coffee grounds. The slide 68 can be operated by turning the handle 145 (Fig. 8) to the position where the water level in the tank 3 will be decreased to the lower end of the pipe 135, 135' or 135" as needed. This can be repeated so long as the water level in the tank 3 is above the inlets to one of the pipes 135, 135' and 135". The gears 137 on the shaft 138 are of different sizes so that an adjustment to make more or less water flow through one charge of coffee grounds would not add to or subtract from the amount for the next charge. The operation may be repeated so long as the container 3 has sufficient hot water therein. When it is desired to replenish the supply of water for the tank 1 or containers 2 and 3 the lid or cover 22 is opened sufficiently to carry the end 32 of the rod 30 to the junction of the slots 28 and 29 (Fig. 5). When this is done and the container 19 is removed the spring 59 turns the arm 50 to place the end 32 in the end of the slot 28 (Fig. 10). The previous operation of closing the lid or cover 22 had turned the lever 40, thus causing the arm 42 and strap 43 to press the arm 36 into position where the roller 38 was caught behind the hook 73, with the arm 39 extending across the slot 28, as shown in Fig. 10. With the parts in the position shown in this figure when the cover or lid 22 is closed the end 32 of the rod 30 turns the arm 34, thus pulling the arm 71, turning the shaft 75 (Fig. 7) and opening the valves 78, 81 and 85, whereupon cold water enters the inlet 77 and passes through the housing 76 and opening 82 through the conduit 83. If the container 2 is not full the float 118 causes the spout 95 to direct water into this container 2. If the float is in the position shown in Fig. 7 the incoming water passes through the spout 95 into the container 3. When the cover reaches near its closed position and opens the valves as just described, the hook 73 passing into the end 26' of the slot 26 becomes disconnected from the roller 38 so that the arm 71 is free, but the catch 114 has in the meantime caught behind the latch 105, thus keeping the valves 78, 82 and 85 open until the float 119 is raised because of the tank 3 becoming filled with water until the catch 114 is disconnected from the end of the pivoted latch 105. When the tanks 2 and 3 become filled the spring 77 returns the shaft 75 to its normal position and closes the valves 78, 82 and 85. While these valves were open the valve closure 88 had moved into position to close the outlet pipe 87 so the water could not pass to the drain.

While water was entering the tanks 2 and 3 and displacing steam or air in the upper portion of the container 1 this steam or air passed through the valve 85 and pipe 92 into the pipe 16 (Fig. 2) and thence through the hollow member 15 into the coffee in the jar 11, thus agitating this coffee and also removing any cool coffee that might have collected in the pipe 16 into the jar 11 where it would be kept hot.

Hot water can be introduced into the space 13 within the jacket 12 simply by opening the valve 90, whereupon hot water passes through a portion of the pipe 17 and thence through the branch pipe 89 to the closed container 93 from which it passes through the openings 131, annular space 130 and openings 132 into the space 13. When the valve 90 is closed this does not close the pipe 17, but leaves it free for hot water to be drawn through it from the tank 2 by opening the valve 17'. After the coffee has been taken out of the jar 11 and it is desired to wash this jar this can be done by admitting enough water into the space 13 to overflow the upper edge of the jar 11. There is no danger of overflowing the jar 12 because the upper end of the outlet pipe 91 from the container 93 is slightly below the upper edge of the jar 12.

Hot water can be drawn from the tank 2 by opening the valve 17' (Fig. 2) whenever hot water is needed for making tea, or for other purposes, without disturbing the supply of hot water in the tank 3 for making coffee, and by turning the handle 74' (Fig. 11) manually the valves 78, 81 and 85 (Fig. 7) can be opened whenever desired for introducing water into the tanks 2 and 3 without lifting and closing the cover 22 which automatically opens these valves when more water is needed.

So long as the coffee grounds container 19 is removed the spring 59 will keep the parts in the position shown in Fig. 10 so that opening and closing the cover or lid 22 would not operate the lever 45 or cause water to flow from the tank 3 into the jar 11. Also, if the tanks 2 and 3 are full of water at that time opening and closing the lid 22 would only momentarily open the valves 78, 81 and 85, if at all, because as soon as the hook 72 was withdrawn from the roller 38 by the end 26' of the slot these valves would be immediately closed by the spring 77, as the float 110 would prevent the catch 114 from holding these valves open under such conditions, A certain amount of steam pressure is maintained above the water level in the tanks 2 and 3 which is sufficient to force the water through the pipes 135, 135' and 135" and the sprayer 141 into the jar 11 when a valve 65, 65' or 65" is opened.

I claim:

1. In a coffee making device, a hot water receptacle, a coffee jar, a pivoted cover over said jar, and means operated by said cover for establishing communication between said receptacle and jar and replenishing the supply of water to said receptacle.

2. In a coffee making device, a hot water receptacle, a coffee jar, a pivoted cover over said jar, a coffee grounds holder above said jar, means operated by said cover to cause water to pass from said receptacle through said holder into said jar, and means controlled by said holder to render said first named means operative.

3. In a coffee making device, a hot water receptacle, a fresh water supply leading to said receptacle and having a valve, a coffee jar, a connection leading from said receptacle to said jar and having a valve, a cover over said jar, and means operated by said cover for opening said valves.

4. In a coffee making device, a hot water receptacle, a fresh water supply leading to said receptacle and having a valve, a coffee jar, a connection leading from said receptacle to said jar and having a valve, a cover over said jar, means operated by said cover for opening said valves, and a float in said receptacle regulating the opening of said fresh water supply valve.

5. In a coffee making device, two hot water receptacles, a fresh water supply leading to one of said receptacles and having a valve, a coffee jar, a connection leading from said receptacles to said jar and having a valve, a cover over said jar, and means operated by said cover for opening said valves.

6. In a coffee making device, two hot water receptacles, a fresh water supply leading to one of said receptacles and having a valve, a coffee jar, a connection leading from said receptacles to said jar and having a valve, a cover over said jar, means operated by said cover for opening said valves, a float in the other one of said receptacles, and means controlled by said float to control the flow of fresh water into said receptacles respectively.

7. In a coffee making device, a hot water receptacle, a coffee jar, a pivoted cover over said jar, a normally closed communicating connection between said receptacle and jar, means operated by opening and closing said cover for opening said communicating connection, means for supplying water to said receptacle, and means for agitating the contents of said coffee jar, said water supplying means being operated by opening and closing said cover and said agitating means being operated by water entering said receptacle.

EDWARD FROMWILLER.